United States Patent
Cattoor et al.

(10) Patent No.: US 11,712,955 B1
(45) Date of Patent: Aug. 1, 2023

(54) MULTI-SPEED ELECTRIC AXLE AND ELECTRIC AXLE SHIFTING STRATEGY

(71) Applicant: Dana Belgium N.V., Flanders (BE)

(72) Inventors: Kurt Cattoor, Koolkerke (BE); Filip D. Schacht, Meulebeke (BE); Filip Van Raepenbusch, Bruges (BE)

(73) Assignee: Dana Belgium N.V., Bruges (BE)

(*) Notice: Subject to any disclaimer, the term of this patent is extended or adjusted under 35 U.S.C. 154(b) by 0 days.

(21) Appl. No.: 17/820,831

(22) Filed: Aug. 18, 2022

(51) Int. Cl.
| | | |
|---|---|---|
| *B60K 17/04* | (2006.01) | |
| *B60K 1/00* | (2006.01) | |
| *B60K 17/16* | (2006.01) | |
| *F16H 37/08* | (2006.01) | |
| *F16H 48/06* | (2006.01) | |

(52) U.S. Cl.
CPC .............. *B60K 1/00* (2013.01); *B60K 17/046* (2013.01); *B60K 17/16* (2013.01); *F16H 37/082* (2013.01); *F16H 48/06* (2013.01); *F16H 2200/0021* (2013.01); *F16H 2200/0034* (2013.01); *F16H 2200/2035* (2013.01)

(58) Field of Classification Search
CPC ........ B60K 1/00; B60K 17/046; B60K 17/16; F16H 37/082; F16H 2200/0021; F16H 2200/0034; F16H 48/06; F16H 2200/2035
See application file for complete search history.

(56) References Cited

U.S. PATENT DOCUMENTS

| | | | | |
|---|---|---|---|---|
| 5,024,636 A | * | 6/1991 | Phebus | B60K 17/046 475/141 |
| 5,478,290 A | * | 12/1995 | Buuck | F16D 25/082 475/140 |
| 7,163,480 B2 | * | 1/2007 | Supina | B60K 6/52 475/5 |
| 7,537,536 B2 | * | 5/2009 | Hvolka | F16H 3/54 475/322 |
| 9,242,555 B2 | | 1/2016 | Wenthen | |
| 9,579,976 B2 | * | 2/2017 | Horsfall | B60K 17/28 |
| 9,637,127 B1 | * | 5/2017 | Cooper | B60W 10/115 |
| 9,950,607 B2 | | 4/2018 | Littlefield et al. | |
| 10,500,940 B2 | | 12/2019 | Garcia et al. | |
| 10,630,140 B2 | | 4/2020 | Pritchard et al. | |
| 11,220,168 B2 | | 1/2022 | Mepham | |
| 11,247,556 B2 | * | 2/2022 | Kucharski | B60K 17/165 |
| 11,577,604 B2 | * | 2/2023 | Engerman | B60K 1/02 |
| 2010/0180722 A1 | | 7/2010 | Sasaki | |
| 2015/0151634 A1 | | 6/2015 | Smetana | |
| 2023/0001777 A1 | * | 1/2023 | Wang | B60K 17/046 |
| 2023/0003266 A1 | * | 1/2023 | Engerman | F16D 41/088 |
| 2023/0003289 A1 | * | 1/2023 | Gowrisankar | F16H 57/037 |
| 2023/0037299 A1 | * | 2/2023 | Wechs | B60K 17/02 |
| 2023/0050981 A1 | * | 2/2023 | Suzuki | F16H 57/0424 |

FOREIGN PATENT DOCUMENTS

DE      102020109116 B3    9/2021

* cited by examiner

*Primary Examiner* — Tinh Dang

(74) *Attorney, Agent, or Firm* — McCoy Russell LLP

(57) ABSTRACT

Systems and methods for a multi-speed electric axle are provided. The multi-speed electric axle includes an electric motor that is rotationally coupled to an input shaft. The multi-speed electric axle also includes a planetary gearset connected to the input shaft via an input gear reduction, a lower-speed clutch that selectively grounds a ring gear in the planetary gearset to a housing, and a higher-speed clutch that selectively connects a sun gear to a carrier.

20 Claims, 3 Drawing Sheets

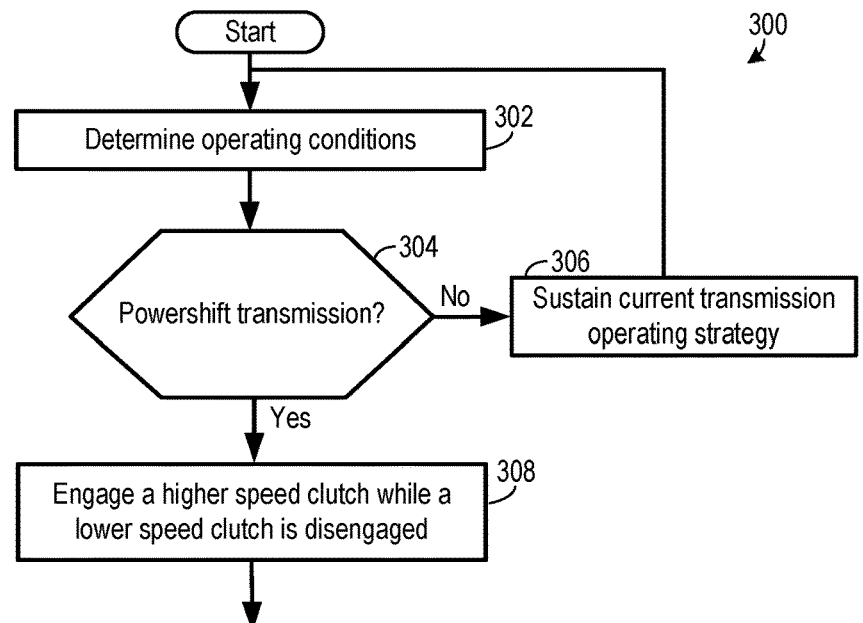
FIG. 2C
FIG. 3
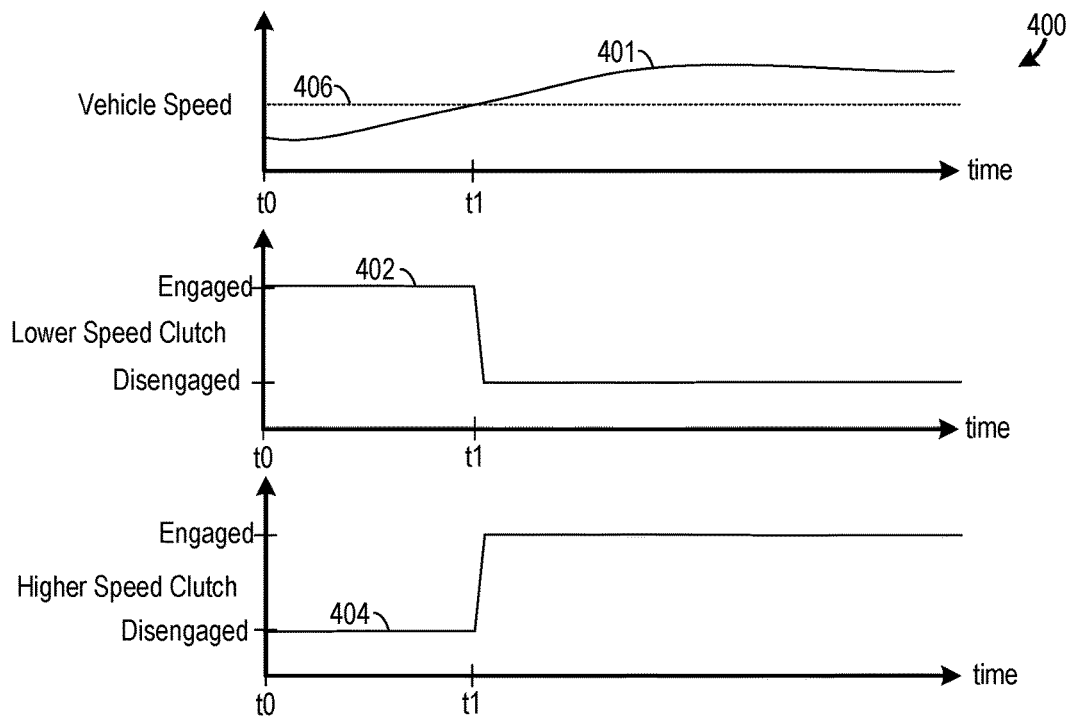
FIG. 4

MULTI-SPEED ELECTRIC AXLE AND ELECTRIC AXLE SHIFTING STRATEGY

TECHNICAL FIELD

The present disclosure relates to a multi-speed electric axle in an electric vehicle and an electric axle shifting method.

BACKGROUND AND SUMMARY

Electric vehicles make use of electric drive units to generate motive power and provide an attractive alternative in terms of hydrocarbon emissions in relation to vehicles that solely rely on internal combustion engines for propulsion. Certain electric drive units have used planetary gearsets to achieve gear reduction and drive unit profile targets. Further, electric axles with integrated transmissions has been utilized in some electric drive units in an attempt to decrease the unit's size.

U.S. Pat. No. 9,950,607 B2 to Littlefield et al. discloses an electric axle. The electric axle includes two simple planetary gearsets, one of which is coupled to an electric motor. In one electric drive unit embodiment, a clutch connects gears in the planetaries and enables gearshift operation in the drive unit.

The inventors have recognized several drawbacks with Littlefield's electric axle as well as other electric axles. For instance, Littlefield's electric axle is not compatible with certain vehicle designs such as some material handling and mining vehicles which demand compact, efficient, and higher performance drivelines that achieve performance characteristics similar to those of diesel or gasoline powered drivelines. More generally, the applicability of Littlefield's electric axle into a variety of vehicle platforms is constrained due to its space inefficiency and performance shortcomings. Further, the use of multiple planetary gearsets in the transmission increases the likelihood of axle degradation.

The inventors have recognized the aforementioned issues and developed a multi-speed electric axle. The electric axle, in one example, includes an electric motor rotationally coupled to an input shaft via an input gear reduction. In the electric axle, a lower-speed clutch that selectively grounds a ring gear in the planetary gearset to a housing. The electric axle further includes a higher-speed clutch that selectively connects a sun gear to a carrier in the planetary gearset. In this way, the electric axle achieves a space efficient envelope as well as multi-speed gear shifting functionality. As a result, the electric axle can be more efficiently incorporated into a wider variety of vehicle platforms.

Further in one example, the input gear reduction includes an idler gear on an idler shaft. In such an example, the electric motor is positioned on a side of the housing that circumferentially encloses the higher-speed clutch and the lower-speed clutch. Designing the input gear reduction and motor with these features allows the compactness of the electric axle to be further increased which decreases the chance of the axle interfering with surrounding systems such as the suspension system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2C is a table that indicates the configurations of the clutches in the operating gears of the multi-speed electric axle, depicted in FIG. 1.

FIG. 3 is a method for operation of a multi-speed electric axle.

FIG. 4 is a timing diagram for a use-case multi-speed electric axle control strategy.

DETAILED DESCRIPTION

An electric axle which achieves a compact arrangement and performance characteristics which allows it to be effectively incorporated into a wide variety of vehicle platforms is described herein. To achieve the compact profile and performance characteristics the axle includes a lower-speed clutch which grounds a ring gear in a planetary gearset to a housing and a higher-speed clutch that selectively connects a sun gear to a carrier in the planetary gearset. The axle further includes an input gear reduction that is coupled to an interior shaft which is in turn coupled to the sun gear. The input gear reduction may include an idler gear positioned between a gear that is attached to an electric motor and a gear that is fixedly coupled to the interior shaft. In this way, the electric machine may be placed in a desired position radially outward from the gearbox.

Figure 1:
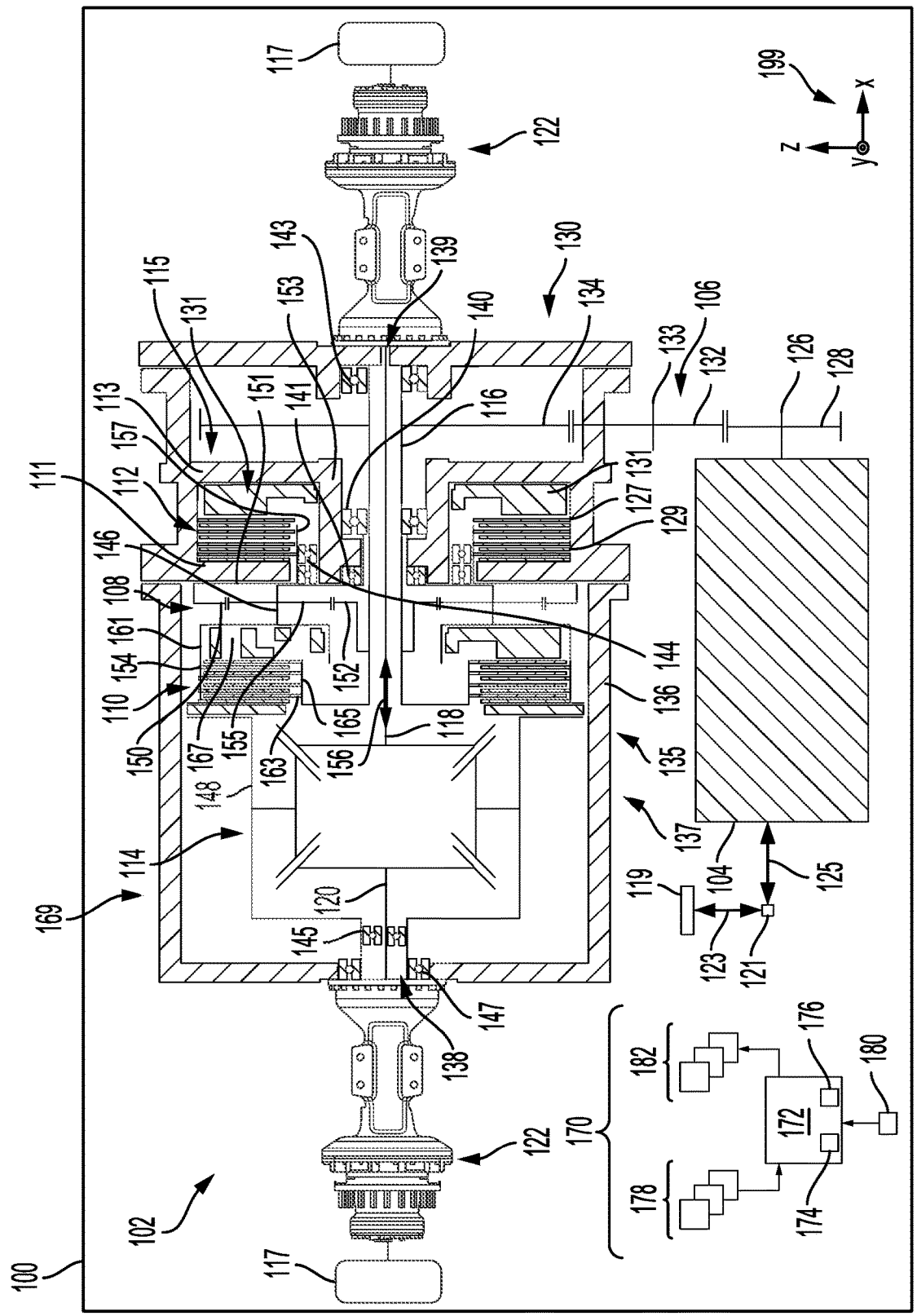
FIG. 1 depicts an electric vehicle (EV) with a multi-speed electric axle.

FIG. 1 depicts an electric vehicle (EV) 100 with a multi-speed electric axle 102 (e.g., two-speed electric axle) that generates motive power for vehicle propulsion. The EV 100 may be a light, medium, or heavy-duty vehicle. An all-electric vehicle may specifically be used due to their reduced complexity and therefore reduced points of potential component degradation. However, hybrid electric vehicle (HEV) embodiments may be employed where the vehicle includes an internal combustion engine (ICE). In some examples, the EV 100 may be a material handling or mining vehicle such as dozers, loaders, various kinds of forklifts, and the like. In other examples, the EV 100 may be a passenger vehicle such as a truck, sedan, wagon, and the like.

The multi-speed electric axle 102 includes an electric motor 104, an input gear reduction 106, a planetary gearset 108, a higher-speed clutch 110, and a lower-speed clutch 112. The multi-speed electric axle 102 may further include an output shaft 116, a differential 114, axle shafts 118, 120 rotationally coupled to the differential, and an axle shaft housing 122. The planetary gearset 108, the higher-speed clutch 110, and the lower-speed clutch 112 may be included in a gearbox 130. Conversely, the electric motor 104, the input shaft 126, an input shaft gear 128, and the axle shaft housing 122 may be located outside the gearbox 130. Further, the axle shaft housing 122 is directly coupled to the housing 137, in the illustrated example. In this way, a compact beam axle may be formed. The electric axle 102 may therefore be an electric beam axle, with mechanical components structurally supporting one another and extending between drive wheels. Thus, in the beam axle embodiment, wheels coupled to the axle may move in unison when articulating, during vehicle travel on uneven road surfaces. Specifically, the camber angle of the wheels may remain substantially constant as the suspension moves through its travel.

The electric motor 104 may include components such a rotor and a stator that electromagnetically interact during operation to generate motive power. Further in one example, the electric motor 104 may be a motor-generator which is configured to generate electrical energy during regeneration operation.

The electric motor 104 may be electrically coupled to one or more energy storage device(s) 119 (e.g., one or more traction batteries, fuel cells, capacitor(s), combinations thereof, and the like) by way of an inverters 121 when the motor is designed as an alternating current (AC) motor. Arrows 123, 125 denote the electrical connection between the electric motor 104, the inverter 121, and the energy storage device(s) 119. This inverter is designed to convert direct current (DC) to alternating current (AC) and vice versa. In one use-case example, the electric motor 104 and the inverter 121 may be three-phase devices which can achieve greater efficiency when compared to other types of devices. However, a motor and an inverter designed to operate using more than three phases have been envisioned. In other examples, the inverter may be omitted from the axle and a DC motor may be used in the electric axle.

FIG. 1 illustrates the electric motor 104 is rotationally coupled to the input shaft 126. The input shaft 126 may be fixedly coupled to the input shaft gear 128 that meshes with an idler gear 132 fixedly coupled to an idler shaft 133. The idler gear 132 meshes with a gear 134 that is fixedly coupled to a shaft 116 which is coaxial to axle shafts 118, 120. The input shaft gear 128, idler gear 132, and the gear 134, are included in the input gear reduction 106, in the illustrated example. However, the input gear reduction may include a fewer number of gears, in one example, or additional gears and shafts, in another example. The configuration of the input gear reduction may be selected based on factors such as the motor's speed range, a desired range of gear ratios in the gearbox 130, the size and configuration of the planetary gearset 108, and the like. The use of the idler gear 132 in the input gear reduction 106 allows the motor 104 to be positioned along a side 135 of a housing 137 of the electric axle. Further, the housing 137 circumferentially encloses components in the gearbox 130 such as the clutches which are expanded upon herein. Positioning the motor in this location allows the electric axle 102 to meet the packaging demands in a wider variety of vehicles, thereby expanding the axle's applicability. The gears described herein include teeth, and mechanical attachment between the gears involves meshing of the teeth on the gear with another associated gear.

The axle housing 137 may have a section 136 between the gearbox 130 and the electric motor 104 that circumferentially encloses the higher-speed clutch 110 and the lower-speed clutch 112 and may be parallel to the rotational axis of the electric motor 104. The housing 137 may have an opening to allow meshing of the idler gear 132 and the gear 134 in the input gear reduction 106. The housing 137 may have openings 138, 139 for the axle shafts 118, 120 which extend laterally from either side of the housing 137.

The housing 137 includes an interior section 115 that supports the lower-speed clutch 112 as well as provide mounting locations for bearings, 140, 141, 144, 145 that support and constrain movement of various components such as the shaft 116. The interior section includes two portions 111, 113 that radially extend inward along opposing axial sides of the lower-speed clutch 112. In this way, the lower-speed clutch is efficiently incorporated into the housing.

The lower-speed clutch 112 is configured to selectively ground a ring gear 150 in the planetary gearset 108 to the housing 137. To achieve this grounding functionality, a first set of plates 127 in the lower-speed clutch 112 may be splined or otherwise attached to the interior section 115 of the housing 137. A second set of plates 129 in the lower-speed clutch 112 may be attached to shaft 151 that extends from the ring gear 150. Further, positioning the lower-speed clutch between the portions of the housing allows the clutch to efficiently ground the ring gear. In this way, the lower-speed clutch 112 is space efficiently incorporated into the gearbox housing. An actuation assembly 131, which may include a hydraulic piston, is configured to selectively induce frictional engagement of the plates in the lower-speed clutch 112. However, other types of actuators such as pneumatic actuators, electromechanical actuators, and the like may be used in the lower-speed clutch, in other examples.

The lower-speed clutch 112 and the higher-speed clutch 110 are illustrated as friction clutches (e.g., wet or dry friction clutches), although other types of clutches may be used in other examples. When friction clutches are used, the gearbox 130 is able to powershift between operating gears with a decreased amount of power interruption when compared to gearboxes using dog clutches, thereby increasing gearbox efficiency during shifting transients.

In the illustrated example, a bearing 140 is coupled to the shaft 116 in the gearbox 130. To elaborate, a bearing 140 is coupled to the shaft 116 and mounted on an axial extension 153 in the housing 137 radially inward from the lower-speed clutch 112 in relation to an axis of rotation 156 of the gearbox 130. Further the bearings described herein may include inner races, outer races, roller elements (e.g., cylindrical rollers, tapered rollers, spherical roller elements, and the like).

Another bearing 141 is coupled to the axial extension 153 and the carrier 146 and a shaft 151 that extends from the ring gear 150 in the lower-speed clutch 112. To elaborate, the shaft 151 provides a mechanical connection between the ring gear 150 and a plate carrier 157 in the lower-speed clutch 112. The plate carrier 157 has the first set of plates 127 mounted thereon. A bearing 143 is positioned near the housing opening 139 in the illustrated example. Further, a bearing 147 is positioned near the housing opening 138 and is coupled to a case 148 of the differential 114. Additionally, the bearing 145 is coupled to the axle shaft 120 and the differential case 148. Bearings 144 are coupled to the axial extension 153 of the housing and the plate carrier 157. In this way, the plate carrier can rotate when the lower-speed clutch is disengaged.

In the illustrated example, the planetary gearset 108 is positioned axially between the higher-speed clutch 110 and the lower-speed clutch 112. In this way, the gearbox can achieve a desired range of gear ratios in a compact arrangement. However, the planetary gearset 108 and the clutches 110, 112 may have other relative positions, in other examples, which may however be less space efficient.

The planetary gearset 108 is connected to an input gear reduction 106 via the shaft 116. The shaft 116 extends through an interior portion of the gearbox 130. To elaborate, the shaft 116 extends through a section in the gearbox that is radial inward from the axial extension 153 of the housing 137 with regard to the rotational axis 156 and the higher and lower speed clutches 110 and 112. In this way, the shaft 116 is space efficiently routed through the gearbox. The input gear reduction 106 includes the gear 128 fixedly coupled to the input shaft 126.

In the illustrated example, the planetary gearset 108 is a simple planetary gearset that includes a sun gear 152, planet gears 155 that rotate on a carrier 146, and the ring gear 150. Using a simple planetary gearset, in comparison to other types of planetaries such as a multi-stage planetary gearset, allows the gearbox 130 to achieve a space efficient package. However, in other examples, the planetary gearset 108 may be a multi-stage planetary gearset, a compound gearset, and the like.

The higher-speed clutch 110 is configured to selectively connect the sun gear 152 to the carrier 146. A first set of plates 154 in the higher-speed clutch 110 is coupled to a case 148 of the differential 114 via an outer plate carrier 161. A second set of plates 163 in the higher-speed clutch 110 is coupled to the shaft 116 via an inner plate carrier 165. An actuation assembly 167 is further included in the higher-speed clutch. The actuation assembly may be a hydraulically actuated piston, in one example, or an electromagnetic actuator or pneumatic actuator in other examples. In the engaged configuration, the higher-speed clutch 110 connects the sun gear 152 to the carrier 146 in the planetary gearset 108. In the disengaged configuration, the higher-speed clutch 110 allows the sun gear 152 and the carrier 146 to independently rotate.

In the illustrated example, the higher-speed clutch 110 and the lower-speed clutch 112 are positioned on one axial side of the differential 114. In this way, the gearbox achieves a profile that is less likely to interfere with surrounding vehicle components, such as suspension components. However, in other examples, the higher-speed clutch 110 and the lower-speed clutch 112 may be located on opposite sides of the differential 114 or various other configurations.

In the illustrated example, the differential 114 is a spider gear type differential. However, in other examples, the differential may be a spur gear differential, a planetary type differential, and the like. Additionally or alternatively, the differential may have locking functionality, limited slip functionality, and the like. The differential 114 is connected to axle shafts 118, 120 which are in turn rotationally coupled to drive wheels 117. The axle shafts 118, 120 may be of different lengths in the illustrated example. However, in other examples, the axle shafts 118, 120 may be of equal lengths or other configurations. Further, the differential 114 may be positioned on a side 169 of the axle to accommodate for incorporation of the gearbox 130 within the housing 137.

The differential 114 allows for speed differentiation between the axle shafts 118, 120 during certain operating conditions. However, as indicated above the differential 114 may have locking or limited slip functionality where the speed differentiation is inhibited or constrained, respectively. The axle shafts 118, 120 extend along and are rotatable about the axis of rotation 156. The differential 114, the higher-speed clutch 110, the lower-speed clutch 112, the shaft 116, planetary gearset 108, the axle shafts 118, 120 are coaxially arranged in the illustrated example. This allows increased compactness in comparison to electric axles with non-coaxial arrangements. Consequently, the electric axle may be incorporated into a wider variety of vehicle platforms, if wanted. However, in other examples, at least a portion of the aforementioned components may not be coaxially arranged, which may decrease the axle's space efficiency.

The EV 100 further includes a control system 170 with a controller 172 as shown in FIG. 1. The controller 172 may include a microcomputer with components such as a processor 174 (e.g., a microprocessor unit), input/output ports, an electronic storage medium 176 for executable programs and calibration values (e.g., a read-only memory chip, random access memory, keep alive memory, a data bus, and the like). The storage medium may be programmed with computer readable data representing instructions executable by the processor for performing the methods and control techniques described herein as well as other variants that are anticipated but not specifically listed.

The controller 172 may receive various signals from sensors 178 coupled to various regions of the EV 100 and the multi-speed electric axle 102. For example, the sensors 178 may include a pedal position sensor that detects a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the electric machine. An input device 180 (e.g., accelerator pedal, brake pedal, drive mode selector, combinations thereof, and the like) may further provide input signals indicative of an operator's intent for vehicle control.

Upon receiving the signals from the various sensors 178 of FIG. 1, the controller 172 processes the received signals, and employs various actuators 182 of vehicle components to adjust the components based on the received signals and instructions stored on the memory of controller 172. For example, the controller 172 may receive an accelerator pedal signal indicative of an operator's request for increased vehicle acceleration. In response, the controller 172 may command operation of the inverters to adjust electric motor power output and increase the power delivered from the electric motor 104 to the gearbox 130. The controller 172 may, during certain operating conditions, send commands to the clutches 110, 112, to engage and disengage the clutches. For instance, a control command may be sent to the clutch 110 and in response to receiving the command, an actuator in the clutch may adjust the clutch based on the command for clutch engagement or disengagement. The other controllable components in the vehicle may function in a similar manner with regard to sensor signals, control commands, and actuator adjustment, for example.

Figure 2B:
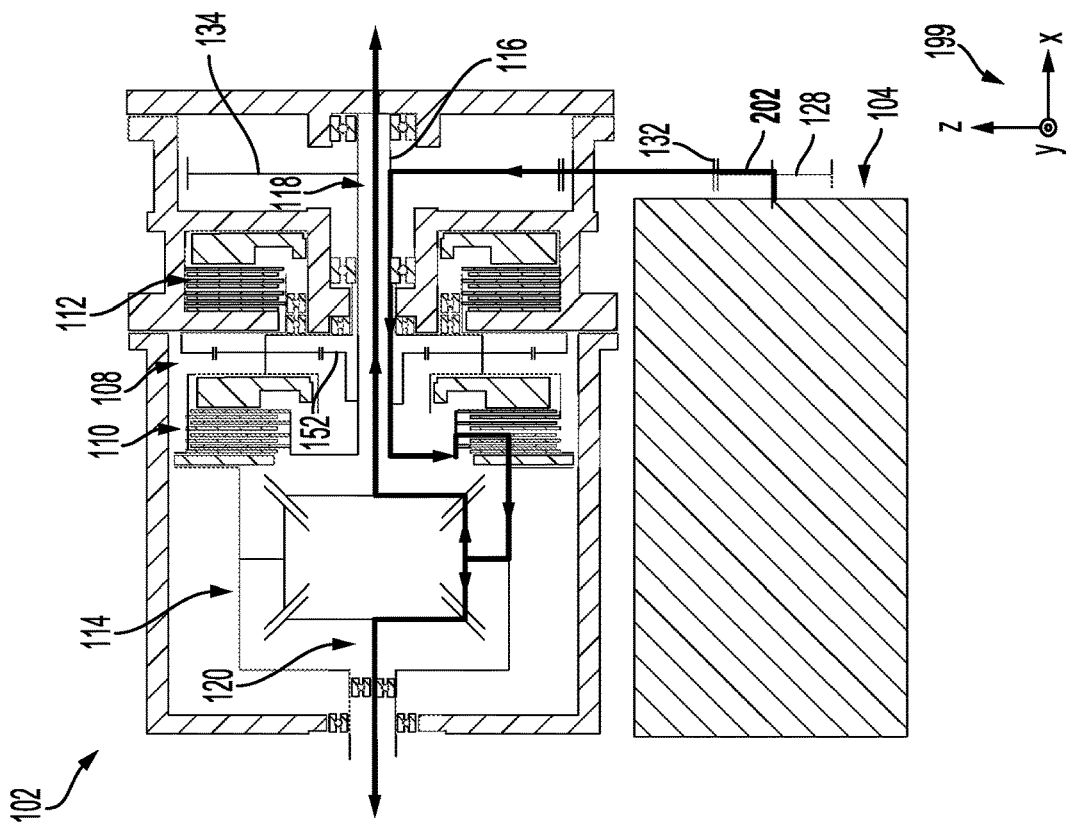
FIGS. 2A and 2B are power path diagrams for the different operating gears of the multi-speed electric axle, depicted in FIG. 1.
Figure 2A:
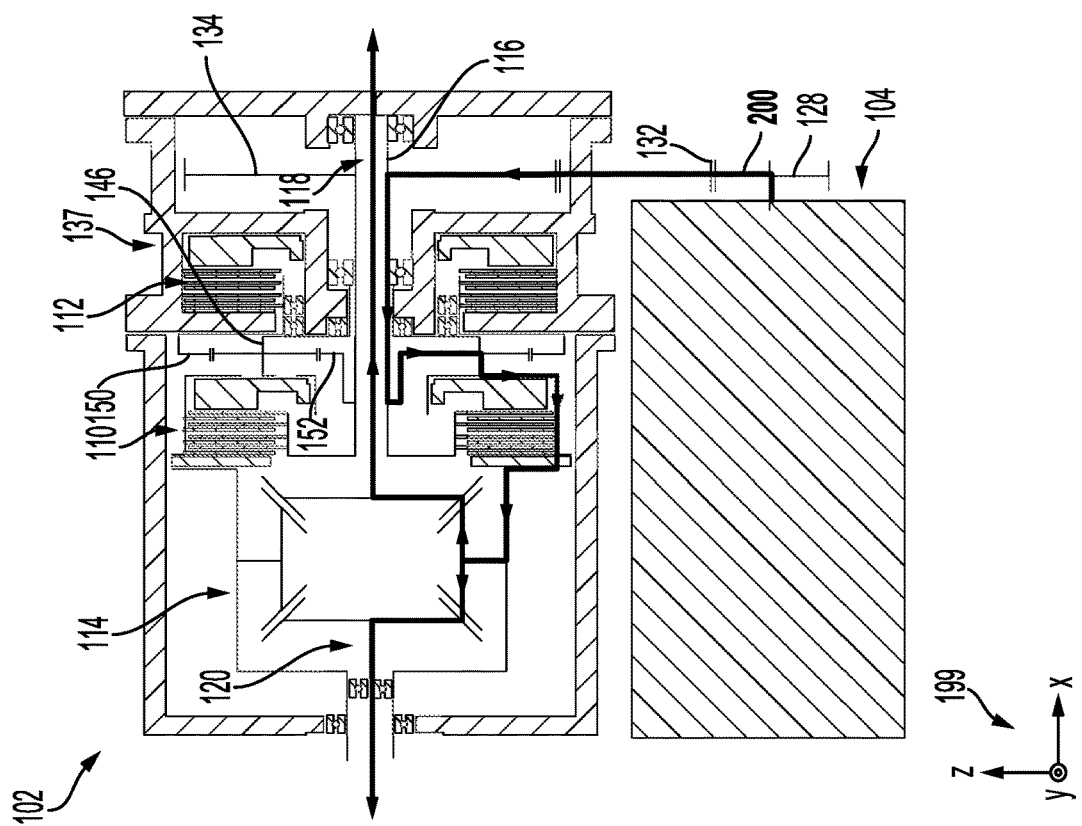

An axis system 199 is provided in FIG. 1 as well as FIGS. 2A-2B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIGS. 2A and 2B show the mechanical power paths 200 and 202 while the multi-speed electric axle 102 operates in a lower gear mode and a higher gear mode, respectively. It will be understood that these power paths may correspond to both forward and reverse drive modes. Further, the electric motor 104 may generate rotational output in opposite directions in the forward and reverse drive modes. In other words, in a forward drive mode, the electric motor rotates the shaft 126, in a first direction and in a reverse drive mode, the motor rotates the output shaft in the opposite direction. Thus, the mechanical power paths 200, 202 shown in FIGS. 2A and 2B generally correspond to drive mode operation. However, it will be appreciated that the electric motor 104 may further be operated in a regeneration mode where the power path travels from the drive wheels to the motor which generates electrical energy for recharging a traction battery.

As illustrated in FIG. 2A, while the gearbox 130 is operating in the lower gear mode, the higher-speed clutch 110 is disengaged and the lower-speed clutch 112 is engaged which grounds the ring gear 150 to the housing 137 and prevents rotation thereof.

The mechanical power path 200 unfolds as follows: mechanical power moves from the electric motor 104 to the input shaft gear 128 from the input shaft gear 128 to the idler gear 132; from the idler gear 132 to the gear 134; from the gear 134 to the shaft 116; from the shaft 116 to sun gear 152; from the sun gear 152 to the carrier 146; from the carrier 146 to the higher-speed clutch 110; from the higher-speed clutch 110 to the differential 114; from the differential 114 to the axle shafts 118, 120; and from the axle shafts 118, 120 to the downstream components.

While the gearbox 130 is operating in the higher gear mode, as shown in FIG. 2B, the higher-speed clutch 110 is engaged and the lower-speed clutch 112 is disengaged. The mechanical power path 202 unfolds as follows: mechanical power moves from the electric motor 104 to the input shaft gear 128; from the input shaft gear 128 to the idler gear 132; from the idler gear 132 to the gear 134; from the gear 134 to the shaft 116; from the shaft 116 to the higher-speed clutch 110; from the higher-speed clutch 110 to the differential 114; from the differential 114 to the axle shafts 118, 120; and from the axle shafts 118, 120 to downstream components. As such, in the higher gear mode of operation, the power path 202 bypasses the planetary gearset 108.

FIG. 2C shows a table 204 that indicates the configurations of the lower-speed clutch 112 and the higher-speed clutch 110 in the lower gear mode and the higher gear mode, respectively. As previously indicated, in the lower gear mode, the lower-speed clutch is engaged (closed) and the higher-speed clutch is disengaged (open) and conversely, in the higher gear mode the lower-speed clutch is disengaged and the higher-speed clutch is engaged.

FIG. 3 shows a method 300 for operation of a multi-speed electric axle system. The method 300 may be carried out by any of the multi-speed electric axle systems or combinations of the multi-speed electric axle system described herein with regard to FIGS. 1-2B. However, the method 300 may be carried via other suitable electric axles, in other examples. Furthermore, the method 300 may be implemented by a controller that includes a processor and memory, as previously discussed.

At 302 the method 300 includes determining operating conditions. The operating conditions may include input device position (e.g., gearshift lever position), clutch configuration, transmission speed, motor speed, vehicle speed, vehicle load, ambient temperature, and the like. The operating conditions may be ascertained via sensor inputs, modeling, look-up tables, and/or other suitable techniques.

Next at 304, the method 300 includes judging if a powershift in the gearbox should be implemented. Such as determination may be carried out responsive to vehicle speed surpassing a threshold value, in one example. In other examples, operator interaction with gear selector may initiate powershift operation.

If it is determined that a powershift should not occur (NO at 304) the method moves to 306 where the method includes sustaining the current transmission operating strategy. For instance, the transmission may be maintained in a lower gear.

Conversely, if it is determined that a powershift should occur (YES at 304) the method moves to 308 where the method includes engaging a higher-speed clutch while disengaging a lower-speed clutch while power delivery from the electric motor to the gearbox is sustained to transition from a lower gear to a higher gear. In this way, the shift may occur with little or no power interruption, if wanted. It will be appreciated that the power shift may occur from the higher-speed mode to the lower-speed mode in a similar manner.

FIG. 4 illustrates a timing diagram 400 of a use-case control strategy for a multi-speed electric axle, such as any of the previously described electric axles or combinations of the electric axles. In each graph, time is indicated on the abscissa and increases from left to right. The ordinate for plot 401 indicates vehicle speed. Other parameters that may be taken into account when making a shift determination include load and/or throttle pedal position. The ordinates for plots 402 and 404 indicate the operational states ("Engaged" and "Disengaged") of the lower and higher speed clutches.

From t0 to t1 the vehicle speed increases and at t1 the speed surpasses a threshold value 406. Responsive to the vehicle speed surpassing the threshold value a powershifting event occurs where the lower-speed clutch transitions into a disengaged state and the higher-speed clutch transitions into an engaged state. It will be understood that the specific clutch control strategy may be more nuanced, in practice. For instance, clutch pressure in the higher-speed clutch may be less abruptly ramped up to allow a smoother transition into the higher gear to occur and reduce the likelihood of unwanted noise, vibration, and harshness (NVH).

The technical effect of the multi-speed electric axle systems and operating methods herein is to provide a technique which allows the multi-speed electric axle to achieve a higher gear ratio for lower speed operation and a lower gear ratio for higher speed operation in a space-efficient package.

FIGS. 1-2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such.

The invention will be further described in the following paragraphs. In one aspect, a multi-speed electric axle is provided that includes an electric motor rotationally coupled to an input shaft. The planetary gearset is connected to the input shaft via an input gear reduction. The lower-speed clutch is configured to selectively ground a ring gear in the planetary gearset to a housing and a higher-speed clutch is configured to selectively connect a sun gear to a carrier in the planetary gearset.

In another aspect, a method for operation of a multi-speed electric axle is provided that, includes powershifting between a higher gear and a lower gear via operation of a higher-speed clutch and a lower-speed clutch in the multi-speed electric axle. The multi-speed electric axle includes an electric motor rotationally coupled to an input shaft and a planetary gearset connected to the inputs shaft via an input gear reduction. The lower-speed clutch is configured to selectively ground a ring gear in the planetary gearset to a housing and a higher-speed clutch is configured to selectively connect a sun gear to a carrier in the planetary gearset.

In yet another aspect, a two-speed electric axle is provided that includes an electric motor driving an input shaft, and a simple planetary gearset connected to the input shaft via an input gear reduction; a lower-speed clutch is configured to selectively ground a ring gear in the planetary gearset to a housing and a higher-speed clutch is configured to, in an engaged position, connect a sun gear and a carrier in the simple planetary gear-set, and in a disengaged configuration, allow the sun gear and the carrier to independently rotate, wherein the simple planetary gearset is directly coupled to a case of a differential.

In any of the aspects or combinations of the aspects, the input gear reduction may include an idler gear on an idler shaft.

In any of the aspects or combinations of the aspects, the electric motor may be positioned on a side of the axle housing that circumferentially encloses the higher-speed clutch and the lower-speed clutch.

In any of the aspects or combinations of the aspects, the high-speed clutch may be directly coupled to a case of a differential.

In any of the aspects or combinations of the aspects, the lower-speed clutch and the higher-speed clutch may be wet friction clutches.

In any of the aspects or combinations of the aspects, the planetary gearset may be a simple planetary gearset.

In any of the aspects or combinations of the aspects, the housing may include an interior section, a portion of which may radially extends inward along an axial side of the lower-speed clutch.

In any of the aspects or combinations of the aspects, a first bearing may be coupled to the shaft and an axially extending portion of the interior section of the housing.

In any of the aspects or combinations of the aspects, a second bearing may be coupled to the axially extending portion of the interior section of the housing and a set of plates in the lower-speed clutch.

In any of the aspects or combinations of the aspects, powershifting between the higher gear and the lower gear may include engaging the higher-speed clutch while disengaging the lower-speed clutch.

In any of the aspects or combinations of the aspects, the planetary gearset, the higher-speed clutch, and the lower-speed clutch may be enclosed within the housing; and the housing is directly coupled to an axle shaft housing.

In any of the aspects or combinations of the aspects, the higher-speed clutch and the lower-speed clutch may be a wet friction clutch that includes a first set of plates and a second set of plates.

In any of the aspects or combinations of the aspects, the second set of plates may be coupled to an inner section of the housing.

In any of the aspects or combinations of the aspects, a set of plates in the higher-speed clutch may be coupled to the case of the differential; and a shaft to which the sun gear is fixedly coupled may be directly coupled to the case.

In any of the aspects or combinations of the aspects, the shaft may extend from the case to a bearing coupled to the housing.

In any of the aspects or combinations of the aspects, the higher-speed clutch and the lower-speed clutch may be positioned on one axial side of the differential.

In any of the aspects or combinations of the aspects, the differential may be a spider gear type differential.

In another representation, a solid beam electric axle in off-highway vehicle is provided that includes a gearbox with a high range clutch and a low range clutch positioned coaxial to one another and a differential, wherein the high range clutch selectively locks rotation of a sun gear and a carrier in a planetary assembly and the low range clutch selectively grounds the ring gear in the planetary assembly.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or driveline control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed electric axle comprising:
   an electric motor rotationally coupled to an input shaft;
   a planetary gearset rotationally coupled to an output shaft;
   a gear reduction rotationally coupled to the input shaft and the output shaft;
   a lower-speed clutch configured to selectively ground a ring gear of the planetary gearset to a housing; and
   a higher-speed clutch configured to selectively connect the output shaft to a carrier of the planetary gearset;
   wherein a sun gear of the planetary gearset is directly coupled to the output shaft;
   wherein the carrier is rotationally coupled to a differential; and
   wherein the higher-speed clutch is positioned axially between the differential and the ring gear.

2. The multi-speed electric axle of claim 1, wherein the input gear reduction includes an idler gear on an idler shaft.

3. The multi-speed electric axle of claim 2, wherein the electric motor is positioned on a side of the housing that circumferentially encloses the higher-speed clutch and the lower-speed clutch.

4. The multi-speed electric axle of claim 1, wherein the higher-speed clutch is directly coupled to a case of a differential.

5. The multi-speed electric axle of claim 1, wherein the lower-speed clutch and the higher-speed clutch are wet friction clutches.

6. The multi-speed electric axle of claim 1, wherein the planetary gearset is a simple planetary gearset.

7. The multi-speed electric axle of claim 1, wherein the sun gear is fixedly coupled to a shaft that is coaxial to an axle shaft.

8. The multi-speed electric axle of claim 7, wherein the housing includes an interior section portion which radially extends inward along an axial side of the lower-speed clutch.

9. The multi-speed electric axle of claim 8, further comprising a first bearing coupled to the shaft and an axially extending portion of the interior section of the housing.

10. The multi-speed electric axle of claim 9, further comprising a second bearing coupled to the axially extending portion of the interior section of the housing and a set of plates of the lower-speed clutch.

11. A method for operation of a multi-speed electric axle, comprising:
    powershifting between a higher gear and a lower gear via operation of a higher-speed clutch and a lower-speed clutch in the multi-speed electric axle;
    wherein the multi-speed electric axle comprises:
      an electric motor rotationally coupled to an input shaft;
      a planetary gearset connected to the input shaft via an input gear reduction;
      the lower-speed clutch configured to selectively ground a ring gear of the planetary gearset to a housing; and
      the higher-speed clutch configured to selectively connect a sun gear to a carrier of the planetary gearset;
    wherein the higher-speed clutch is positioned axially between the differential and the ring gear.

12. The method of claim 11, wherein powershifting between the higher gear and the lower gear includes engaging the higher-speed clutch while disengaging the lower-speed clutch.

13. The method of claim 11, wherein:
    the planetary gearset, the higher-speed clutch, and the lower-speed clutch are enclosed within the housing; and
    the housing is directly coupled to an axle shaft housing.

14. The method of claim 11, wherein the higher-speed clutch and the lower-speed clutch are wet friction clutches that each includes a first set of plates and a second set of plates, respectively.

15. The method of claim 14, wherein the second set of plates is coupled to an inner section of the housing.

16. A two-speed electric axle comprising:
    an electric motor driving an input shaft;
    a simple planetary gearset rotationally coupled to an output shaft which is rotationally coupled to the input shaft via an input gear reduction;
    a higher-speed clutch that selectively grounds a ring gear of a planetary gearset to a housing; and
    a lower-speed clutch that:
      in an engaged configuration, connects a sun gear and a carrier of the simple planetary gearset; and
      in a disengaged configuration, allows the sun gear and the carrier to independently rotate;
    wherein the carrier is directly coupled to a case of a differential; and
    wherein the higher-speed clutch is positioned axially between the differential and the ring gear.

17. The two-speed electric axle of claim 16, wherein:
    a set of plates of the higher-speed clutch is coupled to the case of the differential; and
    a shaft to which the sun gear is fixedly coupled is directly coupled to the case.

18. The two-speed electric axle of claim 16, wherein a shaft extends from the case to a bearing coupled to the housing.

19. The two-speed electric axle of claim 16, wherein the higher-speed clutch and the lower-speed clutch are positioned on one axial side of the differential.

20. The two-speed electric axle of claim 16, wherein the differential is a spider gear type differential.

* * * * *